A. R. MURRAY.
SPEED CHANGING MECHANISM.
APPLICATION FILED JUNE 12, 1911.
1,001,064.
Patented Aug. 22, 1911.
3 SHEETS—SHEET 2.
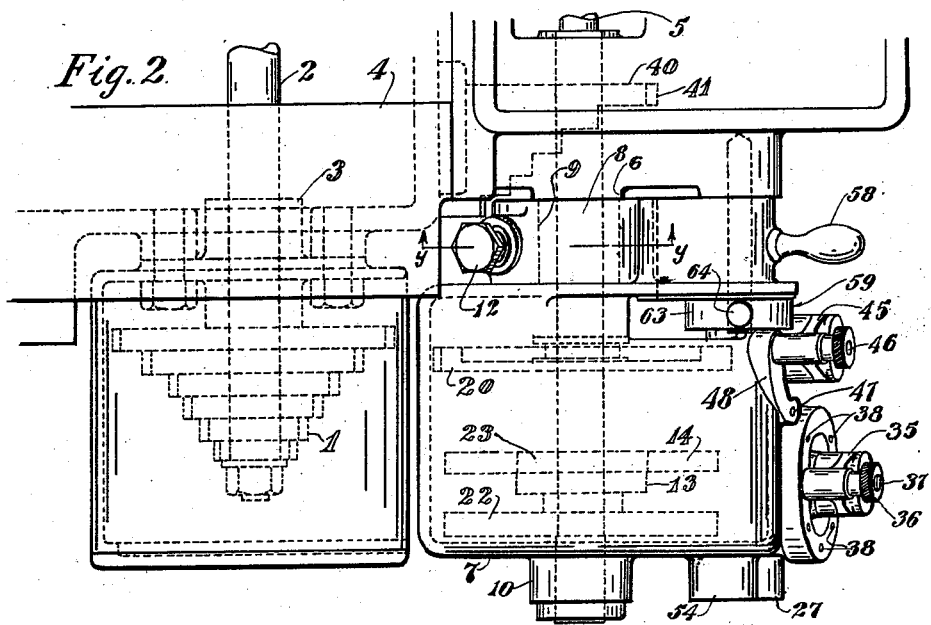
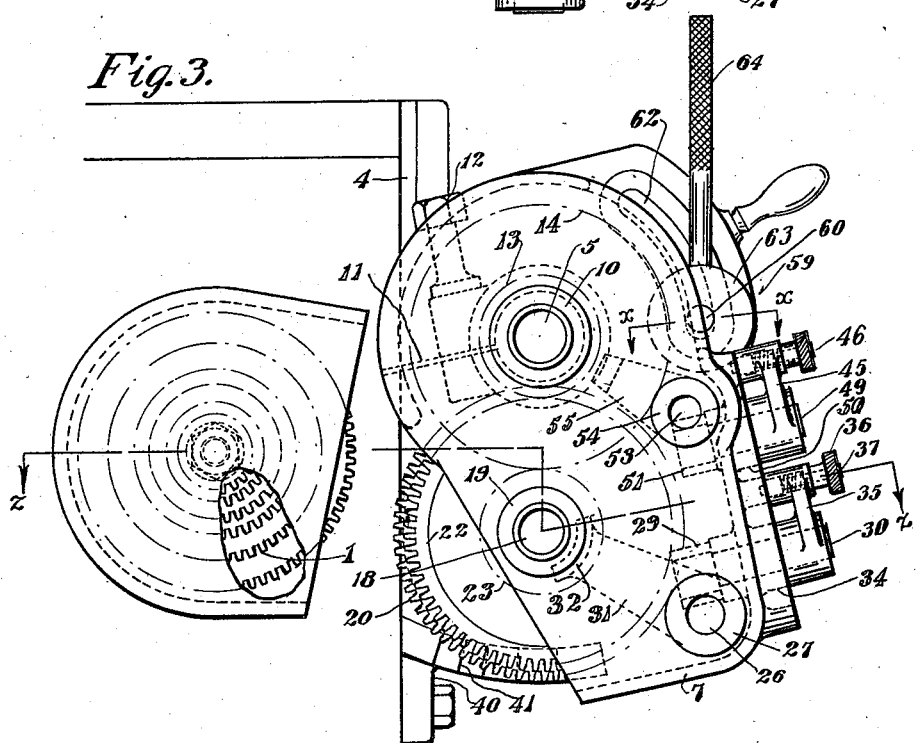

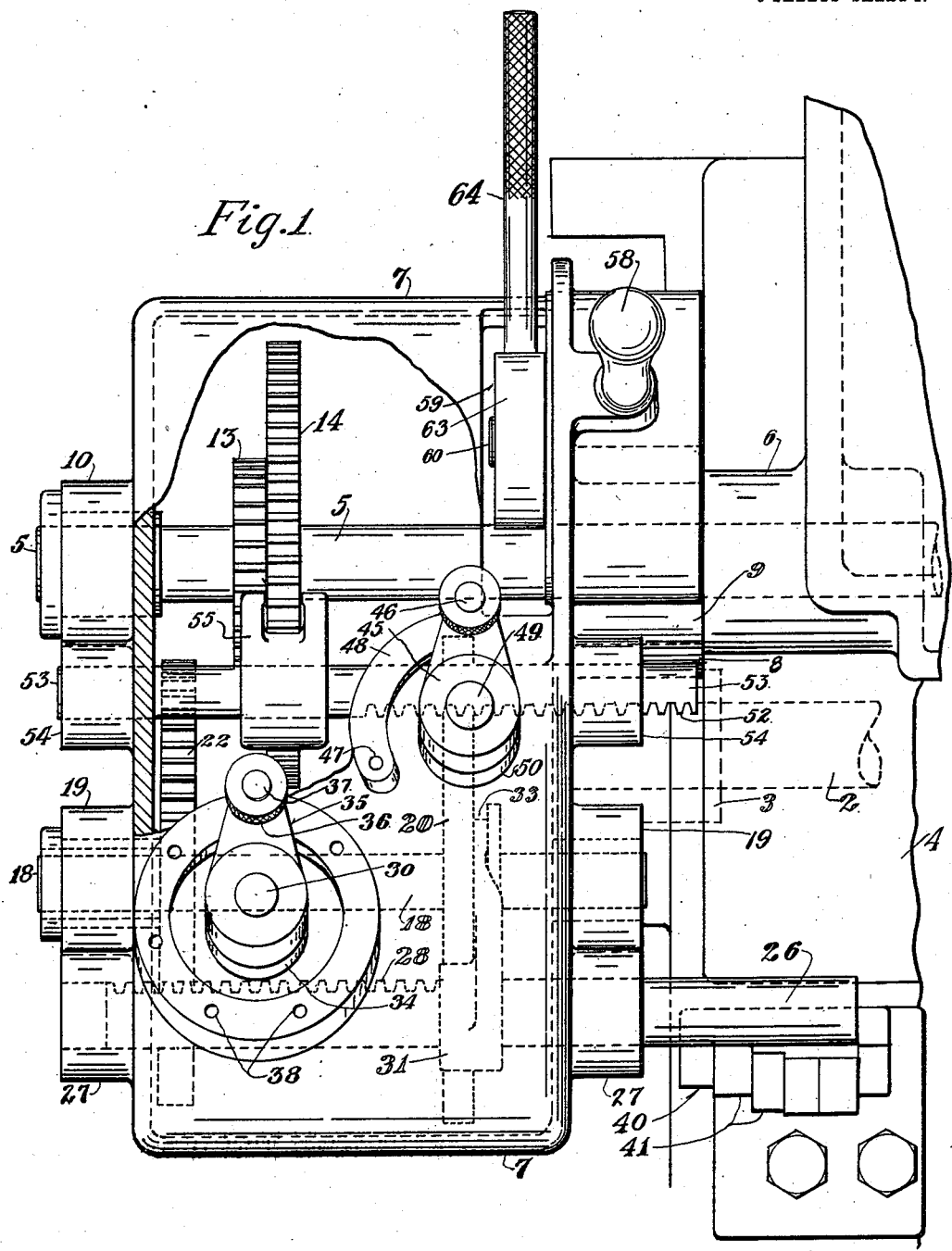

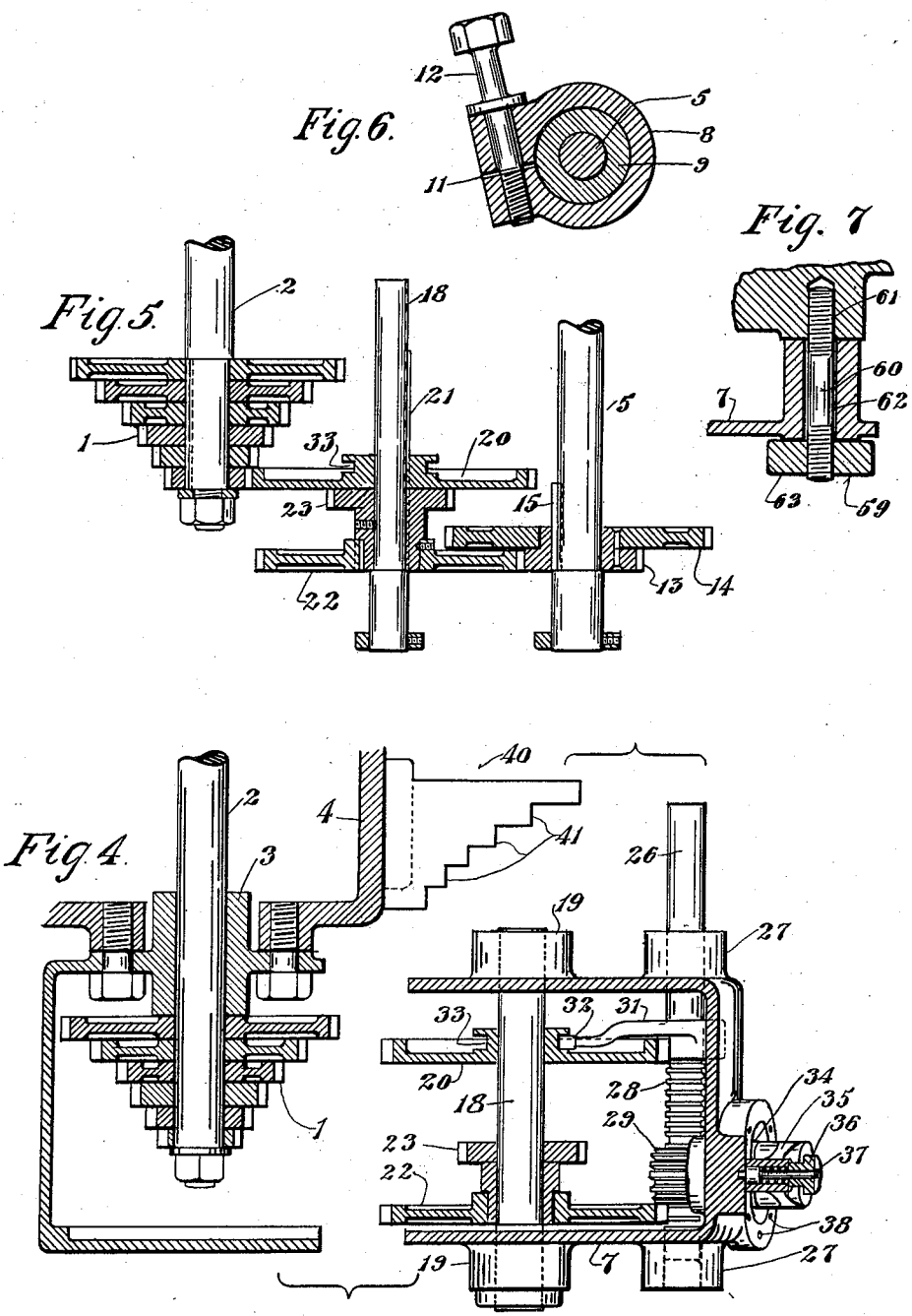

UNITED STATES PATENT OFFICE.

ARISTIDES R. MURRAY, OF CINCINNATI, OHIO, ASSIGNOR TO THE CINCINNATI GEAR CUTTING MACHINE COMPANY, OF CINCINNATI, OHIO, A CORPORATION OF OHIO.

SPEED-CHANGING MECHANISM.

1,001,064.  Specification of Letters Patent.  Patented Aug. 22, 1911.

Application filed June 12, 1911. Serial No. 632,672.

*To all whom it may concern:*

Be it known that I, ARISTIDES R. MURRAY, a citizen of the United States, residing at Cincinnati, in the county of Hamilton and State of Ohio, have invented certain new and useful Improvements in Speed-Changing Mechanism, of which the following is a specification.

It is the object of my invention to provide novel improvements in speed changing mechanism whereby the number of centers of motion may be reduced and wherein centers for a plurality of motions may be coincident for simplifying the mechanism; and, further, to provide novel arrangements of parts embodying a plurality of coacting speed changing means, the pivotal center of one of which is coincident with the center along which motion takes place in the other for effecting speed change.

The invention will be readily understood from the foregoing and from the following description and claims, and from the drawings, in which latter:

Figure 1 is a front elevation of my improved device with the gear-box partly broken away. Fig. 2 is a plan view of the same. Fig. 3 is an end elevation of the same with the gear-box in idle hanging relation. Fig. 4 is a cross-section of the same taken on the irregular line "z—z" of Fig. 3. Fig. 5 is a representation of the gearing, shown in section and laid out in plane, with the gears shown in a changed relation. Fig. 6 is a detail of the manner of pivoting the gear-box, shown in vertical section on the line "y—y" of Fig. 2, and Fig. 7 is a detail in section of the clamp for the gear-box taken on the line "x—x" of Fig. 3.

1 represents a nest of gears of various sizes, shown as a cone of gears, and in the present exemplification is mounted on a shaft 2, which may be the drive shaft, shown journaled in a bearing 3 of a suitable main frame 4.

5 is a shaft, which may be the driven shaft of the mechanism, shown journaled in a bearing 6 of the main frame.

7 is a swingable frame, the pivotal axis of which is preferably coincident with the rotary axis of the shaft 5 and is shown as having a bearing 8 about the bearing 6, which latter may have a journal-extension 9 for the purpose. The swingable frame is shown as a gear-box located to the side of the main frame and swinging on the journal-extension 9. It has a bearing 10 thereon for the outer end of the shaft 5. The bearing 8 is shown as a clamp-bearing, as by being provided with a slit 11, the walls of which may be drawn toward each other by a bolt 12 for maintaining a close fit between the bearing 8 and the journal 9.

The shaft 5 in the present exemplification has thereon a pair of gears 13, 14, fast with each other and arranged to be moved lengthwise of the shaft, as by providing a spline-connection 15 between the said gears and the shaft, the center of this lengthwise motion being coincident with the rotary axes of said gears and the pivotal axis of said swingable frame.

There is an intermediate shaft 18 journaled in the swingable frame, as in bearings 19. This intermediate shaft supports gears which have operative connection with the nest of diversely-sized gears on the shaft 2 and the set of gears on the shaft 5, suitable adjustments being effected between the gears on the intermediate shaft and the gears respectively on the shafts 2 and 5 for conveying rotary movement between the gears on one of said shafts and the intermediate shaft at a plurality of speeds, which may be multiplied between the intermediate shaft and the other of said shafts.

In the present exemplification, I provide a gear 20 on the intermediate shaft which is adjusted laterally for placing the same opposite any one of the nest of gears 1. The gear 20 has spline-connection 21 with the intermediate shaft for the purpose. The intermediate shaft also preferably has a plurality of gears 22, 23, rigid therewith, with which the gears 13, 14, are arranged to make selective engagement. The gears 13, 14 and 22, 23 are shown as sets of diversely-sized gears. The swingable frame is preferably so hung that when in idle hanging relation the gear 20 thereon will be out of mesh with all the gears of said nest of gears, and hang free for permitting its lateral adjustment, and ready to be engaged with any one of said nest of gears by the swinging of said swingable frame. For positioning said gear 20, I provide a longitudinally shiftable rod 26 slidable in bearings 27 of the swingable frame and having thereon a rack 28 with which a pinion 29 secured to a rocker stud 30 is adapted to mesh. The rod 26 carries a shifting arm 31, the shoe 32 of which is arranged to be received in an annular groove 33 in the hub of the gear 20. The rocker stud 30 is journaled in a bearing 34 of the gear-box and carries a manipulating arm 35 which may for instance have a handle 36 for manipulating a spring-pressed pull-pin 37 arranged to be received in any one of a suitable number of holes 38 corresponding in number and relation with the gears of the nest of gears 1.

40 is a stepped-stop with the steps 41 of which the rod 26 coöperates for limiting the swinging movement of the swingable frame 7 into positions depending on the proper pitch-relations between the gear 20 and the respective gears of the nest of gears. The stepped stop is preferably stationarily positioned as by being secured to the main frame.

The rod 26 is moved longitudinally to place the gear 20 controlled thereby opposite the desired one of the nest of gears. The rod is shown protruding from the side of the gear-box and in the form shown the protruding end of the rod coacts with the respective steps of the stepped stop, thus limiting the approach of the gear 20 toward the desired one of said nest of gears, insuring proper pitch-relations between them.

The steps have relative lateral positions which correspond to the relative lateral positions between the gears of the nest of diversely-sized gears and they coact with the longitudinally movable stop to prevent approach between the gear 20 and the gears of the nest of diversely-sized gears closer than the proper pitch-line relation between said gear 20 and the largest one of the gears of said nest of gears opposite which said gear 20 may at any time be placed, so that even if the gear 20 were not correctly placed laterally when the gear-box is swung toward the nest of diversely-sized gears, as for instance to negligently overlap two gears, the longitudinally movable stop would coöperate with that step of the stepped-stop coacting with the larger one of said gears, thereby preventing accident.

The gears 13, 14, are shifted laterally by means of an arm 45 having a spring-pressed pull-pin 46 adapted to be selectively placed in holes 47 of an index-arc 48, the arm being on a rocker-stud 49 journaled in a bearing 50 on the gear-box and having on it a pinion 51 which meshes with a rack 52 on a longitudinally slidable rod 53 slidable in bearings 54 on the gear-box. The rod 53 has on it a fork 55, the tines of which are received at the respective sides of the gear 14 for shifting the set of gears 13, 14, longitudinally on the shaft 5.

The gear-box is preferably so hung that the gear 20 is normally out of mesh with the nest of diversely-sized gears. For effecting this the driving and the driven shafts are preferably located in different horizontal and vertical planes, and the intermediate shaft in a horizontal plane below said first-named horizontal planes. A handle 58 is provided for swinging the gear-box for bringing the gear 20 into mesh with the gear opposite which it may have been placed.

59 is a clamp for holding the swingable frame in place after the gear 20 is properly in mesh. It preferably consists of a screw 60 having connection with the main frame, as shown by the threaded connection 61, and received through an arc-slot 62 of the swingable frame, and a nut 63 having a handle 64 thereon. Movement of the handles 58, 64, in the same directions in sequence causes positioning of the swingable frame.

It will be noted that the pivotal axis of the swingable frame is coincident with the rotary axis of the shaft 5, and that the gears 13, 14, are laterally shiftable along said axes as a center, that the gear 20 is slidable lengthwise of the rotary axes of the gears 22, 23, as a center and is movable toward and from the nest of diversely-sized gears by a swinging movement about the first-named axis, that the said parts collectively have only three centers of movement in performing their various functions, and that the rotary axes of the slip-gears of one speed-changing device is coincident with the pivotal axis of the other speed changing device, the parts coacting for effecting speed-change and multiplying the changes obtained.

Having thus fully described my invention, what I claim as new and desire to secure by Letters Patent is:

1. Speed changing mechanism embracing a swingable frame and a slidable gear respectively having pivotal and rotary axes which are coincident, the said gear slidable relatively to said frame.

2. In speed changing mechanism, the combination of a pair of elements embracing a nest of diversely-sized gears and a shiftable gear arranged to selectively mesh therewith, a swingable frame in which one of said elements is mounted, and stopping mechanism for limiting the swinging of said frame embracing a longitudinally shiftable member controlled simultaneously with the shifting of said gear.

3. In combination, a gear, a gear-box, and a gear slidable in the latter, the said gear-box pivoted for normally swinging said last-named gear away from said first-named gear.

4. In combination, a pair of elements comprising a nest of diversely-sized gears and a gear arranged to selectively mesh therewith, one of which elements is stationarily positioned, a gear-box in which the other of said elements is mounted, means for shifting said last-named element laterally with relation to said gear-box embracing a shiftable member, and a stationarily positioned stepped stop with which said last-named member co-operates for the purpose described.

5. In speed changing mechanism, the combination of a driving member and a driven member, a swingable frame pivoted about one of said members, a gear shiftable longitudinally of said last-named member, an intermediate shaft in said frame, a co-acting gear thereon for said last-named gear, a gear slidable lengthwise of said intermediate shaft, and a nest of diversely-sized gears on the other of said first-named members with which said last-named gear is arranged to selectively mesh.

6. In speed changing mechanism, the combination of a driving member and a driven member, a swingable frame pivoted about one of said members, a gear shiftable longitudinally of said last-named member, an intermediate shaft in said frame, a co-acting gear thereon for said last-named gear, a gear slidable lengthwise of said intermediate shaft, a nest of diversely-sized gears on the other of said first-named members with which said last-named gear is arranged to selectively mesh, means for shifting said last-named gear laterally embracing a longitudinally shiftable rod, and a stepped stop with which said rod co-acts.

7. In speed changing mechanism, the combination of a driving member and a driven member, a swingable box pivoted about one of said members, a frame in which the other of said members is journaled, a nest of diversely-sized gears for said last-named member, and gearing in said box comprising gears caused to mesh by relative lateral shifting between said gears, part of which gears have rotary axes coincident with the pivotal axis of said box, and a laterally shiftable gear rotating with the other part of said last-named gears and having coincident rotary axes, said named laterally shiftable gear arranged to be selectively shifted laterally opposite the respective gears of said nest of diversely-sized gears.

8. In speed changing mechanism, the combination of a driving member and a driven member, a swingable box pivoted about one of said members, a frame in which the other of said members is journaled, a nest of diversely-sized gears for said last-named member, and gearing in said box comprising gears caused to mesh by relative lateral shifting between said gears, part of which gears have rotary axes coincident with the pivotal axis of said box, and a laterally shiftable gear rotating with the other part of said last-named gears and having coincident rotary axes, a stepped stop on said frame, and means for shifting said last-named laterally shiftable gear embracing a longitudinally shiftable member co-acting with the respective steps of said stop.

9. In speed changing mechanism, the combination of a main frame, a drive shaft and driven shaft journaled therein, a swingable frame pivoted about one of said shafts, a plurality of diversely-sized gears for said shaft, an intermediate shaft journaled in said swingable frame, a plurality of diversely-sized gears therefor, means for causing operative connection between said last-named shafts through selective gears of said sets of diversely-sized gears for transmitting different speeds between said shaft about which said swingable frame is pivoted and said intermediate shaft, a nest of diversely-sized gears for the other of said first-named shafts, and a laterally slidable gear rotating with said intermediate shaft and arranged to be placed opposite the respective gears of said nest of gears.

10. In speed changing mechanism, the combination of a main frame, a drive shaft and driven shaft journaled therein, a swingable frame pivoted about one of said shafts, a plurality of diversely-sized gears for said shaft, an intermediate shaft journaled in said swingable frame, a plurality of diversely-sized gears therefor, means for causing operative connection between said last-named shafts through selective gears of said sets of diversely-sized gears for transmitting different speeds between said shaft about which said swingable frame is pivoted and said intermediate shaft, a nest of diversely-sized gears for the other of said first-named shafts, a laterally slidable gear rotating with said intermediate shaft and arranged to be placed opposite the respective gears of said nest of gears, and an automatic positioning stop between said main frame and swinging frame controlled by the shifting of said last-named gear.

11. In speed changing mechanism, the combination of a nest of diversely-sized gears, a swingable frame movable toward and from said gears, a laterally shiftable gear in said swingable frame arranged to be positioned opposite the respective gears of said nest of gears, means for shifting said last-named gear laterally embracing a longitudinally shiftable rod and an engaging part therefor, and a stepped stop, the steps whereof form stopping faces which extend substantially parallel with the longitudinal axis of said longitudinally shiftable rod and arranged to be engaged by said engaging part by movement thereof at substantial right angles to said longitudinal axis.

12. In speed changing mechanism, the combination of a driving member and a driven member stationarily positioned in different horizontal planes, a swingable frame having a pivotal axis coincident with the rotary axis of one of said members, an intermediate shaft journaled in said swingable frame and located in a horizontal plane below said first-named horizontal planes, gearing on said first-named members and transmitting gearing on said intermediate shaft, and constructed and arranged for normally causing the gearing of said swingable frame to assume positions one above the other and out of operative relation with said gearing on the other of said first-named members.

13. In speed changing mechanism, the combination of a stationarily positioned nest of diversely-sized gears, a swingable frame, a gear thereon, a stationarily positioned stepped stop, and means for shifting said last-named gear laterally opposite the respective gears of said nest of gears comprising a longitudinally shiftable rod having a protruding end, the extent of protrusion of which is controlled by the lateral position of said gear for causing said end to selectively coöperate with the steps of said stop.

14. In speed changing mechanism, the combination of a main frame, a drive-shaft and a driven shaft journaled therein, a swingable frame pivoted about one of said shafts, a set of diversely-sized gears rotating with said last-named shaft and slidable lengthwise thereof, an intermediate shaft journaled in said swingable frame and swinging therewith, a set of diversely-sized gears fast thereon with which said last-named diversely-sized gears selectively coöperate, a laterally slidable gear located about and rotating with said intermediate shaft, a nest of diversely-sized gears on the other of said first-named shafts, and means for shifting said last-named gear laterally selectively opposite the respective gears of said nest of diversely-sized gears.

15. In speed changing mechanism, the combination of a main frame, a drive-shaft and a driven shaft journaled therein, a swingable frame pivoted about one of said shafts, a set of diversely-sized gears rotating with said last-named shaft and slidable lengthwise thereof, an intermediate shaft journaled in said swingable frame and swinging therewith, a set of diversely-sized gears fast thereon with which said last-named diversely-sized gears selectively coöperate, a laterally slidable gear located about and rotating with said intermediate shaft, a nest of diversely-sized gears on the other of said first-named shafts, a stepped stop, and means for shifting said last-named gear laterally selectively opposite the respective gears of said nest of diversely-sized gears embracing a longitudinally shiftable rod having an over-hanging end selectively placed opposite the steps of said stop respectively in correlation to the position of said laterally shiftable gear with relation to the respective gears of said nest of gears.

16. Speed changing mechanism embracing a nest of diversely-sized rotatable gears, a swingable frame, mating sets of diversely-sized rotatable gears for transmitting rotation between said gears at different speeds, one of said sets swingable with said swingable frame, and a laterally movable gear rotatable with one of said sets of gears and selectively coöperating with the gears of said nest of gears, said movable parts collectively having three centers of movement.

17. Speed changing mechanism embracing a nest of diversely-sized rotatable gears, a swingable frame, mating sets of diversely-sized rotatable gears having lateral movement between them for transmitting rotation from one to the other of said sets at different speeds, one of said sets of gears swingable with said swingable frame, and a laterally movable gear rotatable with one of said sets of gears and selectively coöperating with the gears of said nest of gears, said movable parts collectively having three centers of movement.

18. In speed changing mechanism, the combination of a nest of diversely-sized gears, a swingable frame, a laterally movable gear thereon, a stepped stop and means on said swingable frame for shifting said last-named gear laterally selectively opposite said gears of said nest of gears and embracing a longitudinally movable member extending to the side of said swingable frame selectively for distances which correspond with the lateral positions of said respective gears of said nest of gears for engaging the respective steps of said stepped stop, the steps of said stop being spaced apart proportional to the differences in radii of said gears of said nest of gears.

19. In speed changing mechanism, the combination of a main frame, a drive shaft and a driven shaft, bearings on said main frame for said shafts, a gear-box pivoted about one of said bearings, a bearing on said gear-box for the shaft journaled in said last-named bearing on said main frame, an intermediate shaft journaled in said gear-box, speed-change gearing between said shaft about which said gear-box is pivoted and said intermediate shaft, a nest of diversely-sized gears on the other of said first-named shafts, a slip-gear on said intermediate shaft, means for shifting said slip-gear opposite the respective gears of said nest of gears, and means for clamping said gear-box in selective positions.

20. In speed changing mechanism, the combination of a main frame, a drive shaft and a driven shaft, bearings on said main frame for said shafts, one of said bearings having an exterior journal-end, a gear-box, a clamp-bearing thereon for said journal-end, a bearing on said gear-box in line with said last-named bearing on said frame for the shaft journaled in said last-named bearing, an intermediate shaft journaled in said gear-box, speed-change gearing between the latter and said last-named shaft journaled in said frame-bearing, a nest of diversely-sized gears on the other of said first-named shafts, a slip-gear on said intermediate shaft, means for shifting said slip-gear opposite the respective gears of said nest of gears, and means for clamping said gear-box in selective positions.

In testimony whereof, I have signed my name hereto in the presence of two subscribing witnesses.

ARISTIDES R. MURRAY.

Witnesses:
 EDWARD SOUTHWORTH,
 ANNA M. RYAN.

Copies of this patent may be obtained for five cents each, by addressing the "Commissioner of Patents, Washington, D. C."